Oct. 28, 1969  F. MORESI  3,475,632

ELECTRIC MOTOR INCORPORATING A PERMANENT MAGNET

Filed Aug. 23, 1966

INVENTOR

FRANCO MORESI

BY Emery L. Groff Jr.

ATTORNEY

United States Patent Office 3,475,632
Patented Oct. 28, 1969

3,475,632
ELECTRIC MOTOR INCORPORATING A PERMANENT MAGNET
Franco Moresi, Lausanne, Vaud, Switzerland, assignor to Paillard S.A., Vaud, Switzerland, a company of Switzerland
Filed Aug. 23, 1966, Ser. No. 574,413
Claims priority, application Switzerland, Sept. 21, 1965, 13,020/65
Int. Cl. H02k 7/00, 7/08, 1/22
U.S. Cl. 310—67        2 Claims

ABSTRACT OF THE DISCLOSURE

An electric motor has a permanent magnet in the form of a solid cylinder which is enclosed within a rotor of non-ferrous material. The rotor and magnet are housed in a cylindrical yoke which is closed at one end by a cap of non-magnetic material. The rotor shaft is supported in bearings one of which is mounted in the non-magnetic cap and the other of which is mounted in a mass of plastic or resin secured to an end of the permanent magnet.

---

The present invention has for its object an electric motor incorporating a permanent magnet and an ironless bell-shaped rotor enclosing the magnet and fitted inside a yoke through which the magnetic flux of the magnet closes, the permanent magnet being secured through its end extending outwardly of the rotor to a non-magnetic part projecting outwardly of the yoke.

Motors of said type are already known and show the advantage of a simplified manufacture. As a matter of fact, the rotor may be obtained by a mere embedding of the winding, of the commutator and of the rotor shaft within a mass of plastics or of resin.

In order to obtain the power required with a magnet of a minimum volume, it is necessary to select for the latter a material adapted to store the largest possible amount of energy BH showing a high coercive field. Such materials are constituted, for instance, by those carrying the registered trade name Ticonal X-X or Ticonal 500. Now these materials are very hard and it is very difficult, if not impossible, to obtain them directly through molding with an opening therein.

The motor according to the present invention is characterized by the fact that the permanent magnet is constituted by a solid diametrically magnetized cylinder the ends of which are provided with smooth surfaces, said cylinder carrying a bearing for the rotor shaft which bearing lies at the end of the magnet facing away from the end secured to the yoke.

According to a preferred embodiment, the rotor shaft may be secured to the wall forming the closed end of said rotor so as to extend to either side of said wall, said shaft being carried on one side of said wall inside a bearing carried by the yoke and on the other side of the wall by a bearing secured to the adjacent end of the magnet.

The present invention has also for its object a method for producing such a motor according to which said shaft bearing secured to the adjacent of the magnet is embedded inside a mass of plastics molded over the end of the magnet so as to secure the bearing to the magnet while the other end of the magnet is glued to a flange of non-magnetic material in which a bearing is then machined co-axially with the cylindrical magnet, whtich bearing is adapted to co-operate with the adjacent end of the yoke.

The accompanying drawings illustrate diagrammatically and by way of example a preferred embodiment of the motor forming the object of the invention together with a modification of said embodiment. In said drawings.

Figure 1:
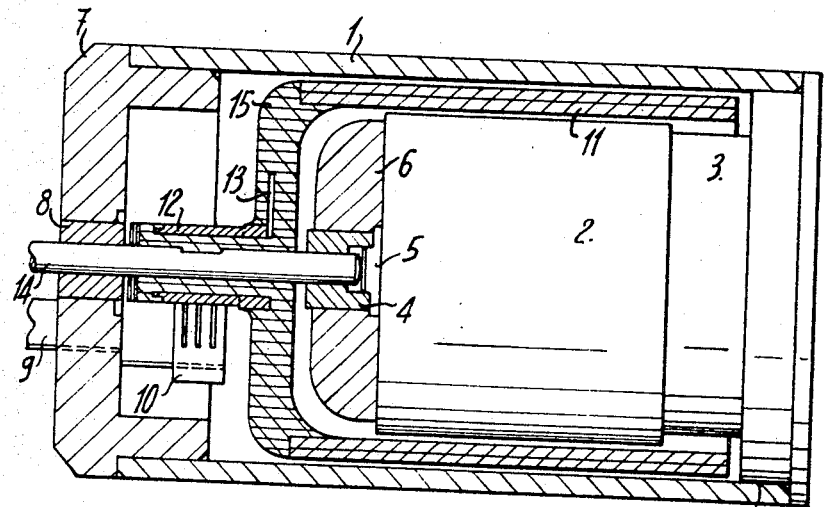
FIG. 1 is an axial sectional view of the motor.

The motor illustrated includes a cylindrical yoke 1 of mild ferromagnetic material surrounding a permanent magnet 2 constituted by a solid cylinder glued to a flange 3. The magnet 2 is magnetized diametrically, the induced flux closing through the yoke 1.

The flange 3 is provided with an enlarged section forming a bearing surface 3' engagin the yoke 1, the centering of the magnet with reference to the yoke 1 being ensured by gluing first the magnet to the flange 3 after which the bearing surface 3' is machined on a lathe co-axially with reference to the magnet 2.

A bearing is secured to the other end of the magnet 2 and is constituted by a bush 4 of self-lubricating sintered bronze fitted on a disk 5 acting as a thrust bearing, said two members 4 and 5 being embedded coaxially with reference to the magnet 2 within a mass 6 of plastic or resin.

The end of the yoke 1 opposed to the flange 3 is closed by a flange 7 engaging said yoke along a coaxial bearing surface. Said flange 7 carries a second bearing constituted by a bush 8 also made of self-lubricating sintered bronze housed in an axial bore of the flange 7. The flange 7 is made of an insulating material and carries two eye terminals 9 driven into the flange 7, only one of said eyes being shown in FIG. 1. Said eyes 9 carry each a brush 10 welded to the corresponding eye. These brushes are constituted each by a spring blade of which one end is cut longitudinally into several strips as clearly shown in FIG. 1 while its other end is welded to the corresponding eye.

The rotor comprises five windings 11 of enamelled wire surrounding the magnet, a commutator 12 of a silver and copper alloy, the different blades of which are welded to five wires 13 connected with the corresponding windings 11 and a carrier shaft 14. These different parts of the rotor are rigidly interconnected by a mass 15 of plastics or of a synthetic resin so as to form therewith the complete rotor.

In the execution of the rotor, it is of advantage to embed through molding the commutator 12 inside the mass 15 in the shape of a complete ring, after which said ring is milled so as to form the blades.

Figure 2:
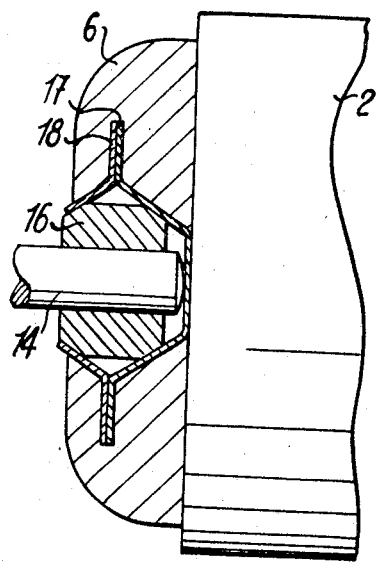
FIG. 2 is a partial sectional view of a modification of the bearing secured to the magnet.

FIG. 2 illustrates a modification of the bearing secured to the magnet. The cylindrical bush 4 described hereinabove is replaced by a rotula-shaped bush 16 adapted to cut out any possible lack of alignment of the shaft 14. Said bush 16 is fitted inside a housing formed by a dished member 17 and a spring washer 18. The whole arrangement is embedded in the molded material cast over the end of the magnet as in the preceding case illustrated in FIG. 1.

According to a further modification, it is possible to glue over the end of the magnet facing the rotor shaft a washer of a non-magnetic material inside which is ultimately machined a housing for the bush so as to cut out the molding step in the securing of the bush.

I claim:

1. An electric motor comprising a bell-shaped non-ferrous rotor, a solid diametrically magnetized cylindrical magnet provided with smooth transverse surfaces and enclosed inside the rotor, a cylindrical yoke surrounding the rotor and through which the magnetic flux of the magnet closes a non-magnetic closing member extending over the open end of the rotor, fitted inside the corresponding end of the yoke and carrying the corresponding end of the magnet, a rotor shaft extending through the other, closed end of the rotor, and a bearing rigid with the end of the cylindrical magnet opposite the closing member and carrying the rotor shaft, said motor comprising a mass of resin adhering to the end of the cylindrical magnet carrying the bearing and embedding same.

2. A motor as claimed in claim 1, including a thrust absorbing member rigid with the bearing for the rotor shaft, carried by the cylindrical magnet and embedded in said mass of resin.

References Cited

UNITED STATES PATENTS

| | | |
|---|---|---|
| 2,709,228 | 5/1955 | Miller et al. _____ 310—43 X |
| 2,849,630 | 8/1958 | Waloff et al. _____ 310—266 X |
| 2,860,267 | 11/1958 | Hayes _____ 310—266 |
| 2,952,788 | 9/1960 | Volkerling et al. _____ 310—266 |

ORIS L. RADER, Primary Examiner

E. SUTTON, Assistant Examiner

U.S. Cl. X.R.

310—90, 154, 266